United States Patent [19]

Evers et al.

[11] Patent Number: 4,993,597
[45] Date of Patent: Feb. 19, 1991

[54] AUTOMATIC BEVERAGE DISPENSER COMPRISING ELECTROMAGNETICALLY OPERATED MIXING MEANS

[75] Inventors: Lucas Evers, Tk Nieuwegein; Willem Van Reeuwijk, Jh Sliedrecht, both of Netherlands

[73] Assignee: Koninklijke Olland Industrie En Handelmij B.V., Nieuwegein, Netherlands

[21] Appl. No.: 412,611

[22] Filed: Sep. 26, 1989

Related U.S. Application Data

[63] Continuation of Ser. No. 173,192, Mar. 24, 1988, abandoned.

[30] Foreign Application Priority Data

Mar. 31, 1987 [NL] Netherlands .......................... 8700760

[51] Int. Cl.⁵ .............................................. B67D 5/60
[52] U.S. Cl. ..................................... 222/145; 222/196; 222/333; 366/273
[58] Field of Search ...................... 222/129.1, 145, 196, 222/199, 333, 504; 366/127, 273, 274

[56] References Cited

U.S. PATENT DOCUMENTS

| | | | |
|---|---|---|---|
| 3,168,292 | 2/1965 | Joschko | 222/129.1 |
| 3,184,112 | 5/1965 | Loeser | 222/145 |
| 3,382,897 | 5/1968 | Skiera et al. | 222/129.1 |
| 3,460,716 | 8/1969 | Thomas | 222/145 |
| 3,784,170 | 1/1974 | Petersen et al. | 366/273 |
| 3,905,583 | 9/1975 | Messance et al. | 366/273 |
| 3,907,258 | 9/1975 | Spaziani | 366/273 |
| 4,011,969 | 3/1977 | Martin | 222/196 |
| 4,193,522 | 3/1980 | Edelbach | 222/145 |
| 4,496,245 | 1/1985 | Conrad et al. | 366/273 |
| 4,649,118 | 3/1987 | Anderson | 366/274 |

FOREIGN PATENT DOCUMENTS 0127970 12/1984 European Pat. Off. .
2401001 7/1975 Fed. Rep. of Germany .

*Primary Examiner*—H. Grant Skaggs
*Attorney, Agent, or Firm*—Bauer & Schaffer

[57] ABSTRACT

A beverage dispenser for supplying beverages such as coffee, tea, soup, and the like, having a stirrer apparatus located in a housing and driven by an electromagnet exterior of the housing and not a drive shaft connected to a motor. The electromagnet drive may be left stationary in the dispenser during cleaning and does not require seals.

6 Claims, 3 Drawing Sheets

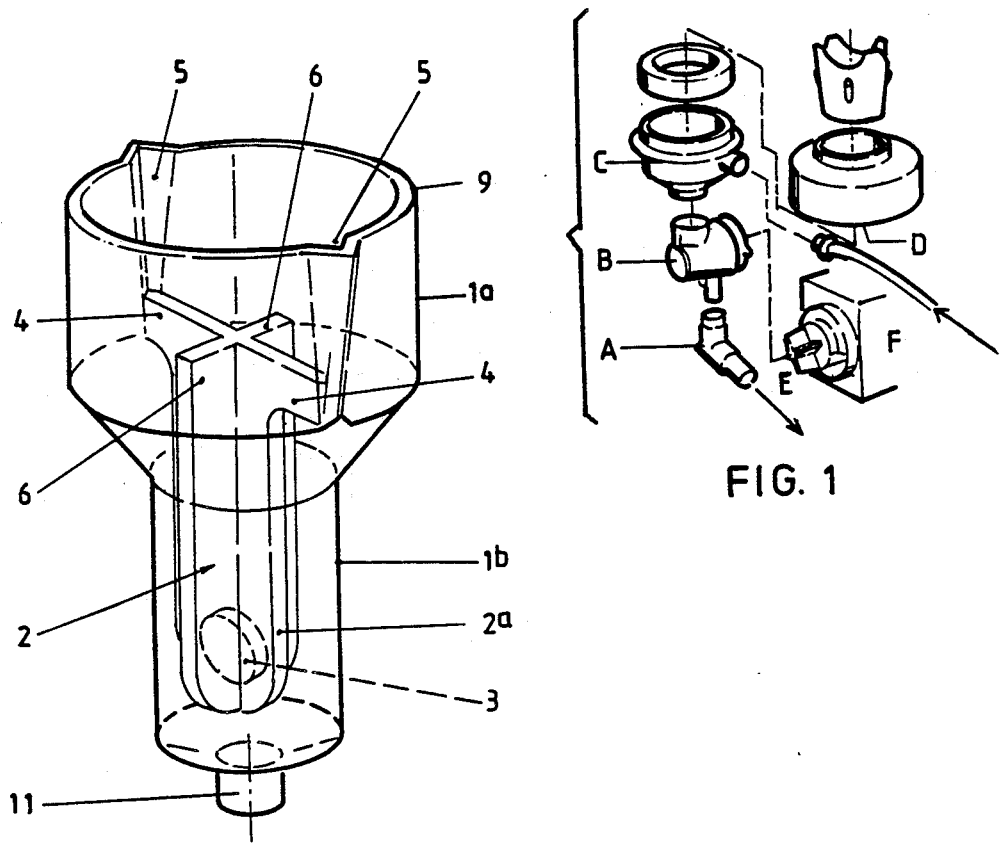
FIG. 1
FIG. 2a
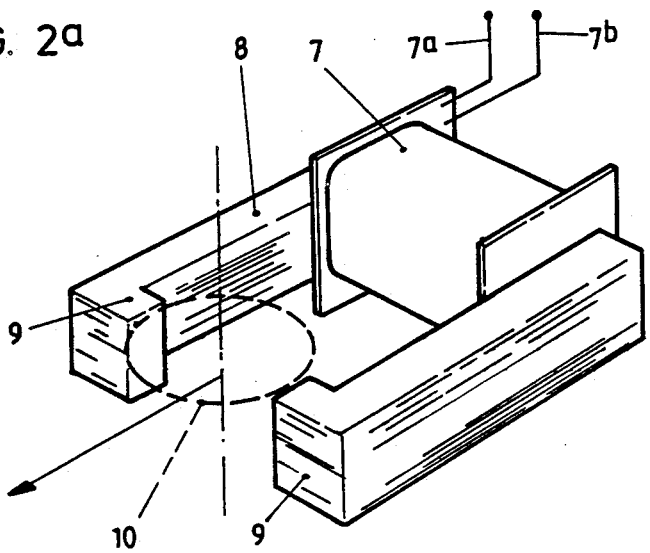
FIG. 2b

AUTOMATIC BEVERAGE DISPENSER COMPRISING ELECTROMAGNETICALLY OPERATED MIXING MEANS This is a continuation of Ser. No.: 173,192 Filed: Mar. 24, 1988 now abandoned.

BACKGROUND OF THE INVENTION

The invention relates to a mixing apparatus for an automatic beverage dispenser and particularly to an apparatus for mixing a liquid with a powder or other liquid such as in a coffee or tea dispenser.

Mixing devices are known wherein as seen from FIG. 1 a mixing beaker C and D is provided for receipt of the liquid and powder, and a stirrer housing B is mounted below it. A discharge spout A is located at the bottom of the stirrer housing. Typically, the stirrer has one or more blades E secured to the shaft of an electromotor F contained in a separate motor housing. This housing is assembled with the stirrer housing by means of a twist-lock connection including an interposed seal. A second seal is provided where the motor shaft leaves the motor housing to seal the motor housing against the ingress of liquid. A disadvantage of the known device is that even with these seals, leakage occurs after a certain period of use, particularly where the motor shaft leaves the housing. This leads to oxidation, seizing of the shaft, and burning of the motor.

Further, the apparatus must be cleaned often because it is very important to maintain hygiene in automatic dispensers, especially for hot beverages. Therefore, the mixing beaker, the stirrer housing and the discharge spout have to be formed so that they may be disassembled. Generally, it is not possible to disassemble the stirrer from the motor shaft so that the stirrer itself cannot be cleaned very well. Disassembling the stirrer housing from the motor housing requires some effort because of the seal, which will also wear more quickly because of repeated disassembly. This means that the maintenance work is labor intensive.

An automatic beverage dispenser is also known from DEA No. 2401001 having a mixing beaker, the lower end of which constitutes a stirring housing. The drive motor is mounted on a bracket fixed to the dispenser housing so that the motor is positioned above the mixing beaker, and the motor shaft extends through a cover provided on the beaker. To clean the device the bracket may be removed together with the motor and the stirrer provided that the cover is simultaneously removed. Nevertheless, due to the connection with the motor and its current terminals, cleaning the stirrer is onerous. This automatic beverage dispenser is not very compact due to the fact that the motor is positioned over the mixing beaker.

A stirring device having a rotating stirrer is known per se from EPA No. 0,127,970, corresponding to U.S. Ser. No. 502,619 now U.S. Pat. No. 4,465,377.

A stirrer having a resilient mixing fin incorporating a permanent magnet is known per se from GB-2,069,355A.

SUMMARY OF THE INVENTION

The invention aims at removing the above-mentioned disadvantages. This is achieved according to the invention by making the stirrer removable and movable in the stirrer housing with its axis coincident with the vertical housing axis and arranging the stirrer in the field of an electromagnet.

Since the electromotor with its drive shaft are eliminated, the leakage problem has been solved. The stirrer may be loosely placed or hung in the stirrer housing, which thereby can be easily removed and replaced after cleaning.

As a consequence of the electromagnetic drive the stirrer may be placed vertically and so can the stirrer housing. Thereby, the contour of the device may be very much simplified. Because the mixing beaker is vertical, the mixing beaker and the stirrer housing may be manufactured as an integral unit. Because this unit may be of simple design and self-releasing in the vertical direction it may be manufactured by a cheaper process than the usual die casting such as by vacuum forming or blowing. In that case the pieces may be manufactured with very thin walls so that even a disposable mixing beaker could be used. In that case no cleaning need take place at all since the used mixing beaker can be removed and a new one inserted in its place. Due to the fact that the number of parts is reduced, a practical refill-set may be designed in the case of a non-disposable embodiment. In that case the operations for cleaning are the same as those with disposable embodiments, and the cleaning of the used set may take place at a different location.

Due to these improvements, the time necessary for cleaning the automatic dispenser is strongly reduced as is the cost of maintenance.

It also appears from the above that the ergonomics of the maintenance are much improved; fewer separate parts, no compulsory sequence of assembling and disassembling and only a simple action.

Because the design is simplified and there are no longer unattainable corners in which remains of the ingredients may collect, cleaning takes place more effectively, which is beneficial to the maintanence of hygiene. The disposable embodiment is ideal from the hygienic point of view, but working with a refill-set also will be beneficial because then the cleaning may be made centrally in a cleaning apparatus such as a dish washer, and this is more effective than in a bucket carried by the operator.

In one embodiment the device is manufactured substantially from synthetic material, and the stirrer is in the form of a rotor for a metallic squirrel cage motor.

In order to exclude friction, it is preferable according to the invention that the rotor be loosely supported on a journal in the housing and that when the electromagnetic is not energized the center of the cage, as seen in the vertical direction, is situated somewhat below the center of the electromagnet coil. In that case the rotor is lifted from the journal when the magnet is energized.

In another embodiment the stirrer is shaped as a stirring fin, and a permanent magnet is located in the axis of that fin with its field direction parallel to the field of the electromagnet. The mixing fin is structured as a weak spring, e.g., of silicone rubber which is fixedly but releasable hung within the mixing beaker. Under the influence of the magnetic field the spring device will then carry out a translatory vibrational movement.

Likewise the stirrer may be a mixing fin having along its axis a permanent magnet, the field direction of which is perpendicular to the electromagnet field. In that case a vibratory movement in the rotational direction is produced when the fin is alternately twisted to the right and to the left.

The mixing fin may be rigid and connected at its upper end to a strip of resilient material, e.g., silicone rubber extending transversely to its axis. Thus, the fin, which is rigid in itself, is alternately moved through the same angle along its full lenth so that the maximum stirring action is produced. Silicone rubber is advantageous in that it is suitable for contact with foods. The resilient material in the form of a strip may extend along a diameter of a ring and be integrally attached therewith so that the strip may be easily located in its position in the mixing device. Preferably, the dimensions of the ring are chosen such that the ring may be sealingly placed between the mixing beaker and the stirrer housing.

It is advantageous that the permanent magnet be provided at a lower portion of the mixing fin, thus having a smaller transverse dimension than the upper portion of the mixing fin. Thereby, the air gap of the electromagnet can be made smaller, yet having equal capacity and a larger attractive force. The mixing effect is consequently increased.

If it is intended to foam the beverage, it may be advantageous to provide the mixing fin with slots, whereby a whisk effect is produced.

The invention will hereunder be further explained with reference to the drawing in which embodiments of the mixing device according to the invention are shown.

BRIEF DESCRIPTION OF THE DRAWINGS

In the Drawings

FIG. 1 is an exploded view of a prior art automatic beverage dispenser;

FIG. 2a is a view of the stirring apparatus according to the present invention, having a twisting mixing fin;

FIG. 2b is a perspective view of the electromagnet means employed in the present invention;

FIG. 3b is a plan view of the apparatus shown in FIG. 3a;

FIG. 4b is a plan view of the apparatus shown in FIG. 4a;

FIG. 5b is a plan view of the apparatus shown in FIG. 5a;

DESCRIPTION OF THE INVENTION

Figure 3B:
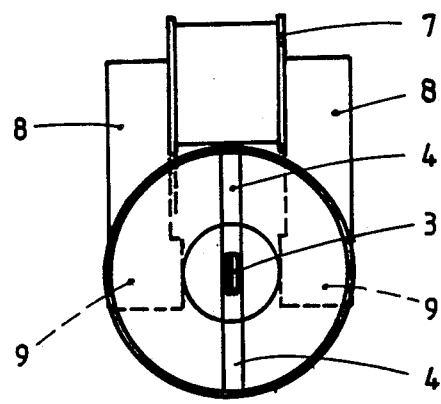

The prior art device is schematically shown in FIG. 1, in exploded view, in which a mixing beaker C, a stirrer housing B, a discharge spout A, a motor housing E, and a stirrer E mounted on the motor shaft are provided.

The mixing device as seen in FIG. 2 comprises the embodiment wherein a mixing fin has a permanent magnet positioned perpendicular to an electromagnet field, specifically consisting of a funnel shaped mixing beaker 1a integral with a cylindrical stirrer housing 1b. A cruxiform-shaped, flexible mixing fin 2 is mounted within the beaker 1a to depend within the stirrer housing 1b. The fin 2 is formed of a pair of crossed flat parts 2a in one of which parts a permanent magnet 3 is embedded at its lower end. At its upper end the mixing fin 2 is broadened into two rigid ears 4 which extend radially into and are hung in slit-shaped recesses 5 formed in the wall of the mixing beaker 1a. The slits are tapered and flare open into the upper edge 9 of the mixing beaker 1a so that the mixing fin may be inserted into the slots, allowing the flat parts 2a to removably enter into the stirrer housing along the axis of the housing.

Figure 5B:
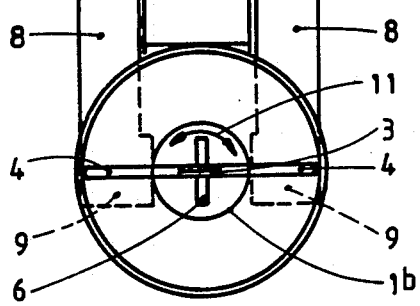
Figure 5A:
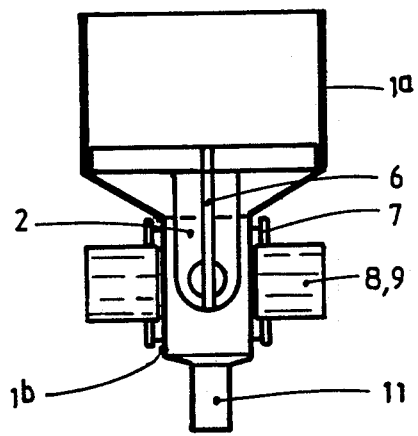
FIG. 5a is yet another view similar to FIGS. 3 and 4, showing a stirring apparatus embodiying the present invention, employing a twisting rigid mixing fin.

In FIGS. 5a and 5b, which develop this embodiment, it will be seen that a permanent magnet 3 of cylindrical disk shape is provided with its poles on its flat faces so that, for example, the north pole, shown hatched, and the south pole, shown without hatching, lie in vertical planes about the axis of the rotation. In certain cases it may be preferable to provide in the center of the mixing fin transverse ridges perpendicular to its plane so as to reinforce the magnet.

An electromagnet consisting of an armature 8 provided with a wire coil 7 having its ends 7a and 7b connected to an alternating current source (not shown) is provided as the driving source for the stirrer. The coil 7 is wrapped about the transverse beam of the armature 8, which is formed of a stack of U-shaped soft iron sheets, providing at the free ends of the arms pole shoes 9.

Through the use of connectors (not shown) provided on the housing frame of the automatic beverage dispenser the stirrer housing 1b is placed centrally between the pole shoes 9, as indicated by the broken line circle 10 in FIG. 2b. The connectors are such that the center of the permanent magnet 3 lies centrally within the common axis of the pole shoes 9. It will be obvious that the permanent magnet 3 may be shaped otherwise than the cylindrical disk shown.

If now an alternating current source is connected to ends 7a and 7b, the pole shoes 9 will become alternately the north pole and the south pole of an electromagnet field. In this manner the north pole side of the permanent magnet 3 is alternately attracted and rejected by both field poles as is the south pole side of the permanent magnet. The stirrer fin 2 manufactured from a resilient non-magnetic material, e.g. silicone rubber, reacts to the alternate attraction and rejection of the permanent magnet, causing alternate twisting in two directions, around the axis of the fin, as shown by the double arrow 11 in FIG. 5a.

Liquid is supplied to the top of the mixing beaker and can now be stirred by the alternate movement of the mixing fin and discharged at the lower end of the housing 1b through a conduit connected to a pivotable discharge spout 11, e.g. into a glass cup or the like placed below the spout.

Figure 4B:
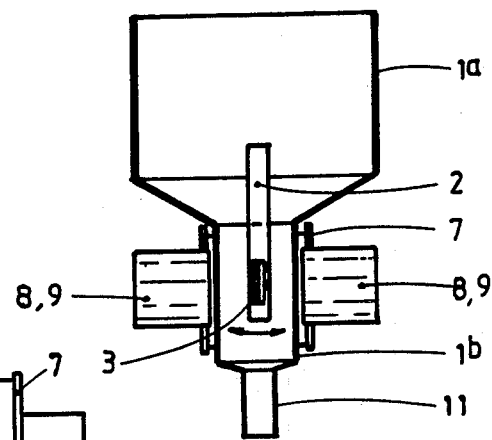
Figure 4A:
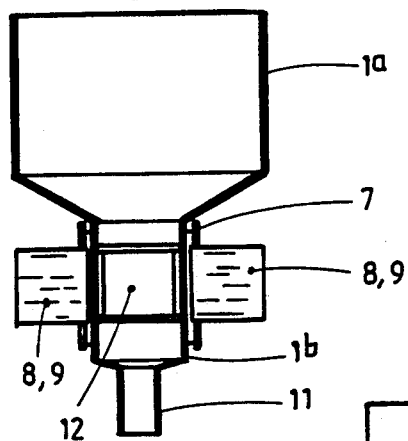
FIG. 4a is a view similar to FIG. 3a, showing a stirrer embodying the present inventions, having a translatory mixing fin.

FIG. 4 shows an embodiment in which the plane of the mixing fin 2 now lies perpendicular to the field direction of the electromagnet field. Thus, the fin produces a translatory or vibrating alternate movement in the direction of the axis of the pole shoes 9 as the current is switched on. In this case the mixing fin 2 is not provided with a reinforcement ridge 6. The ridge may also be omitted in the embodiments according to FIGS. 2a and 5 or be differently shaped, dependent on the material of the fin.

Figure 6:
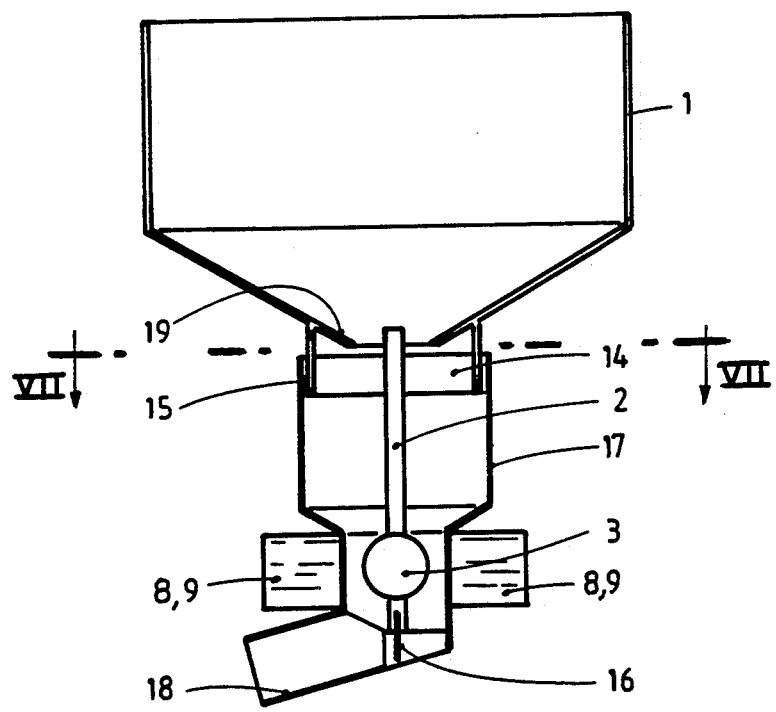
FIG. 6 is a view of a stirring apparatus according to the present invention, employing alternating rotation of the mixing fin.
Figure 7:
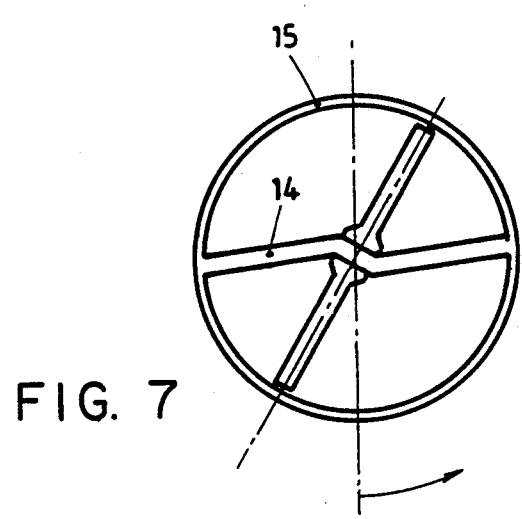
FIG. 7 is a section view along lines VII—VII of FIG. 6.

In FIG. 6 a very advantageous modification of the embodiment of FIG. 5 is shown. It will be understood that the twisting of the fin 2 according to the embodiment of FIG. 5 is maximum at the position of the magnet 3 and decreases towards the upper end of the resilient fin 2 so that the mixing effect decreases, the further away from the magnet and its flux field. According to FIG. 6 the fin 2 is rigid and is connected at its upper end to a highly resilient transverse strip 14 (preferably silicone rubber), which strip 14 is fixed with its ends relative to the mixing beaker 1. This is here exemplified by providing the strip 14 as a diametral part of a rigid ring 15 of the same material, which ring 15 is placed in clamping situation below the recesses 5 and between the lower end of the mixing beaker and a separable cylindrically-shaped stirrer housing 17. In this embodiment the mixing beaker 1 and the stirrer housing 17 are made in two parts so that the cylindrical discharge end of the mixing beaker is placed within the ring 15 which acts as a seal about the housing 17 and with recesses (not shown) in its edge around the strip 14. The stirrer housing 17 has an integral formed discharged piece 18 in the shape of a bent knee which may be adjusted in a desired direction relative to the housing of the automatic beverage dispenser (not shown) in that the relative position between knee 18 and ring 15 may be freely selected. A separately formed knee spout can be employed in the embodiments of FIGS. 4 and 5 where the housing 1, because the fin is fixedly positioned in angular position in the housing depending on the field direction of the electromagnet (7, 8, 9) cannot be moved.

In order to prevent engagement between the lower end of the fin 2 and the housing wall, which would hinder the movement and create noise, the end may be fixed through a pin 16 held in the bottom wall of the knee piece 18. The pin 16 can be inserted by lifting the fin and ring 15.

To insure that the material to be mixed flows along the bottom of the mixing beaker 1 downwardly into the stirrer housing 2 the bottom of the beaker 1 is extended inwardly by a so-called splash rim 19. The rim 19 also prevents the liquid from flowing back into the beaker 1, even when the strip 14 and the stirrer 2 move the liquid with a strong force laterally and upwardly at that location.

Figure 3A:
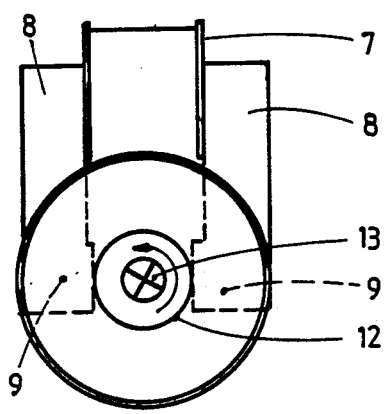
FIG. 3a is a vertical section of a stirrer embodying the present invention, having a squirrel cage rotor.

Finally FIG. 3 shows a further embodiment in which the stirrer comprises a hollow rotor 12, which is received within the cylindrical lower part 1b, which represents the stirrer housing. This mixing rotor comprises, in the manner of an electric squirrel cage motor, a cage having vertical bars extending parallel to the housing axis and is manufactured of a conductive metal. If now the field of the electromagnet is energized, the rotor starts turning and carries out the mixing operation. It is advantageous therewith to provide a so-called starting coil because, otherwise, the rotor does not start moving. A fin 13 having a cross-shaped section is provided within the hollow rotor into which the liquid is supplied from the mixing beaker 1a, said cross-shaped fin serving to produce the necessary mixing effect.

As has already been said, the lower part of the mixing fins according to FIGS. 2a, 4, and 5 may have a lateral dimension equal to the largest lateral dimension of the permanent magnet, and the lower housing portion 1b directly over the magnet may be widened to about the diameter size of the upper part 1a of the housing, extending gradually or conically thereto. The portion of the mixing fin between the upper supporting end and the magnet 3 thereby may be widened and e.g. provided with vertical slots in the surface whereby said portion produces a so-called whisk effect. The pole shoe ends 9 may be brought close to the permanent magnet 3 so that the air gap becomes smaller, and thereby the attractive force of the electromagnet becomes greater.

The mixing device as described is suitable for mixing powdered material such as milk powder, cocoa powder, sugar, and soup powder with liquids such as coffee, tea, and hot water. Of course, different mixtures are also possible.

We claim:

1. Apparatus for mixing a liquid composition comprising a beaker having an inlet for liquid and an inlet for material to be mixed with the liquid, said beaker having an outlet at its lower end, a housing depending vertically from said beaker below said outlet to receive the material and liquid and having a discharge opening at its lower end, a stirrer freely located in said depending housing having its central axis coincident with the vertical axis of said housing and being vertically removable from said housing free of any other part of said apparatus, permanent magnet means embedded within said stirrer, and an electromagnet surrounding said housing to provide a magnetic force field in the plane of said permanent magnet means to cause said stirrer to alternate rotatively about said central axis to mix said liquid and material.

2. The apparatus according to claim 1 wherein said beaker, housing, and stirrer are formed of non-magnetic material.

3. The apparatus according to claim 1, wherein the stirrer comprises an elongated resilient fin depending freely from its upper end in said housing, and the permanent magnet is embedded within said fin along the central axis thereof so that the field of said permanent magnet lies within the plane of the electromagnetic force field.

4. The apparatus according to claim 3 wherein the direction of the field of the permanent magnet is parallel to the direction of the electromagnetic force field.

5. The apparatus according to claim 3 wherein the direction of the field of the permanent magnet is perpendicular to the direction of the electromagnetic force field.

6. Apparatus for mixing a liquid composition comprising a beaker having an inlet for liquid and an inlet for material to be mixed with the liquid, said beaker having an outlet at its lower end, a housing depending vertically from said beaker below said outlet to receive the material and liquid and having a discharge opening at its lower end, a stirrer freely located in said depending housing and having its central axis coincident with the vertical axis of said housing, said stirrer comprising a fin secured at its upper end to an elastic strip, said strip extending transversely to the axis of said fin and being diametrically secured to the ring, said ring being removably mounted within said housing and fixed with respect thereto and an electromagnet surrounding said housing to provide a magnetic force field to cause said fin to alternate rotatively about said central axis to mix said liquid and material.

* * * * *